(12) United States Patent
Schwarz, Jr. et al.

(10) Patent No.: US 12,160,430 B1
(45) Date of Patent: Dec. 3, 2024

(54) HARDWARE MONITORING SYSTEMS AND METHODS

(71) Applicant: United Services Automobile Association (USAA), San Antonio, TX (US)

(72) Inventors: Thomas Wayne Schwarz, Jr., Helotes, TX (US); Sean Carl Mitchem, San Antonio, TX (US); Timothy Blair Chalmers, San Antonio, TX (US); Robert Lee Black, San Antonio, TX (US); Gideon Bowie Luck, Wylie, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 529 days.

(21) Appl. No.: 17/354,602

(22) Filed: Jun. 22, 2021

Related U.S. Application Data

(60) Provisional application No. 63/046,172, filed on Jun. 30, 2020.

(51) Int. Cl.
| | | |
|---|---|---|
| *H04L 9/40* | (2022.01) | |
| *G06F 1/28* | (2006.01) | |
| *G16Y 30/10* | (2020.01) | |
| *H04L 12/12* | (2006.01) | |
| *H04L 43/0811* | (2022.01) | |
| *H04L 67/75* | (2022.01) | |

(52) U.S. Cl.
CPC ............ *H04L 63/1416* (2013.01); *G06F 1/28* (2013.01); *G16Y 30/10* (2020.01); *H04L 12/12* (2013.01); *H04L 43/0811* (2013.01); *H04L 67/75* (2022.05)

(58) Field of Classification Search
None
See application file for complete search history.

(56) References Cited

U.S. PATENT DOCUMENTS

| | | | | |
|---|---|---|---|---|
| 2011/0187532 | A1* | 8/2011 | Edelstein | G08B 13/1418 340/571 |
| 2013/0305062 | A1* | 11/2013 | Falk | H04L 67/12 713/193 |
| 2014/0280920 | A1* | 9/2014 | Foley | H04L 43/0811 709/224 |
| 2016/0261425 | A1* | 9/2016 | Horton | H04L 67/1097 |
| 2019/0327229 | A1* | 10/2019 | Crombez | G06F 21/6254 |
| 2020/0374307 | A1* | 11/2020 | Yoshino | B25J 13/00 |

* cited by examiner

*Primary Examiner* — Syed A Roni
(74) *Attorney, Agent, or Firm* — Fletcher Yoder P.C.

(57) ABSTRACT

Embodiments are described herein for systems and methods for continuously monitoring an electronic device to determine if tampering is possibly occurring with respect to the electronic device. For example, in certain embodiments, a hardware monitoring device may be configured to be communicatively coupled to the electronic device, and to transmit a command signal indicative of a network connectivity alarm to the electronic device in response to detecting that the hardware monitoring device has lost connection with a communication network. In addition, in certain embodiments, the hardware monitoring device may also be configured to indirectly couple the electronic device to a power source, and to transmit a command signal indicative of a tampering alarm in response to detecting that the hardware monitoring device has lost connection with the power source.

13 Claims, 7 Drawing Sheets

HARDWARE MONITORING SYSTEMS AND METHODS

CROSS-REFERENCE TO RELATED APPLICATION

The present application claims benefit of and priority to U.S. Provisional Patent Application Ser. No. 63/046,172, titled "Hardware Monitoring Systems and Methods," which was filed on Jun. 30, 2020, and which is herein incorporated by reference in its entirety for all purposes.

BACKGROUND

The present disclosure relates generally to systems and methods for continuously monitoring an electronic device to determine if tampering is possibly occurring with respect to the electronic device.

The number and variety of network-compatible computing devices has increased greatly in recent years with the advent of "smart" devices. However, the increased number of computing devices connected to a network increases the risks of network security breaches. For example, some "smart" devices (e.g., Internet of Things (IoT) devices) may be subject to malicious software attacks and gain access to secure information from other computing devices (e.g., computers and smartphones). As such, improvements in network security that take into account the varied operations of network-compatible computing devices are desirable.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

Embodiments of the present disclosure include systems and methods for continuously monitoring an electronic device to determine if tampering is possibly occurring with respect to the electronic device. For example, in certain embodiments, a hardware monitoring device may be configured to be communicatively coupled to the electronic device, and to transmit a command signal indicative of a network connectivity alarm to the electronic device in response to detecting that the hardware monitoring device has lost connection with a communication network. In addition, in certain embodiments, the hardware monitoring device may also be configured to indirectly couple the electronic device to a power source, and to transmit a command signal indicative of a tampering alarm in response to detecting that the hardware monitoring device has lost connection with the power source.

In certain embodiments, a hardware monitoring device includes a first electrical connector configured to communicatively couple the hardware monitoring device to an electronic device. The hardware monitoring device also includes communication circuitry configured to enable a communication connection of the hardware monitoring device with a communication network. The hardware monitoring device further includes at least one processor configured to execute instructions stored in at least one memory medium of the hardware monitoring device. The instructions, when executed by the at least one processor, cause the at least one processor to detect if the communication circuitry has lost the communication connection with the communication network, and to transmit a first command signal to the electronic device in response to detecting that the communication circuitry has lost the communication connection with the communication network, wherein the first command signal is indicative of a network connectivity alarm.

In addition, in certain embodiments, a method includes detecting, via a hardware monitoring device, if communication circuitry of the hardware monitoring device has lost a first communication connection with a communication network. The method also includes, in response to the hardware monitoring device detecting that the communication circuitry of the hardware monitoring device has lost the first communication connection with the communication network, transmitting a first command signal from the hardware monitoring device to an electronic device communicatively coupled to the hardware monitoring device to provide a network connectivity alarm via an output device of the electronic device.

In addition, in certain embodiments, a hardware monitoring system includes an electronic device configured to execute hardware monitoring software to facilitate detection of tampering with the electronic device based at least in part on a state of at least one hardware monitoring sensor of the electronic device.

In addition, in certain embodiments, a hardware monitoring system includes a hardware monitoring device configured to facilitate detection of tampering with an electronic device communicatively coupled to the hardware monitoring device based at least in part on a state of the hardware monitoring device.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
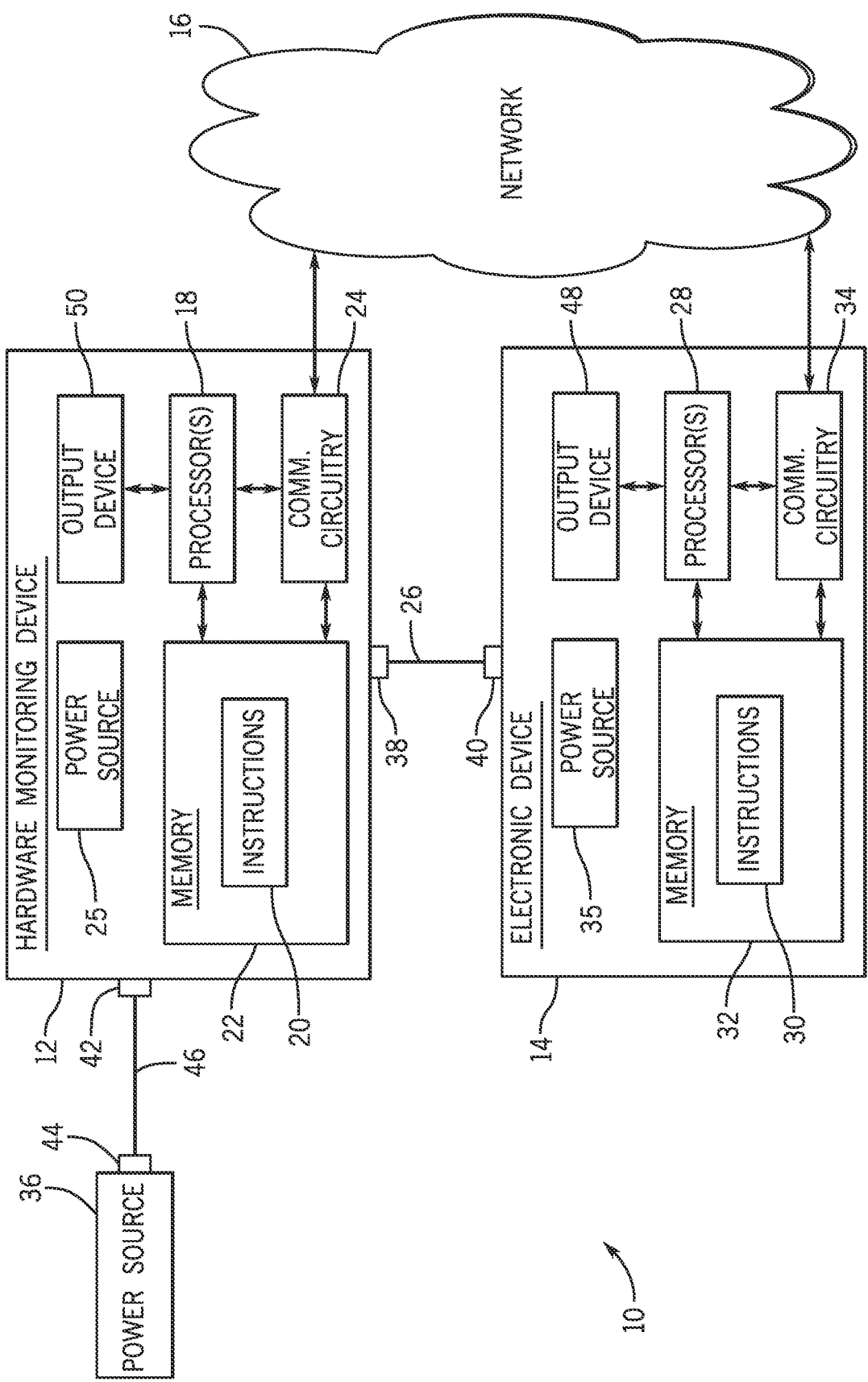
FIG. 1 is a schematic diagram of a hardware monitoring system that includes a hardware monitoring device configured to monitor the activity of an electronic device, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

In the following description, for the purposes of explanation, numerous specific details are set forth in order to provide a thorough understanding of embodiments of the present disclosure. It will be apparent, however, to one skilled in the art that embodiments of the present disclosure may be practiced without some of these specific details.

As used herein, terms "continuous" and "continuously" may refer to ongoing (e.g., iterative) actions that are performed without interruption or are performed with interruptions that take no longer than a relatively short period of time, such as no longer than a 5-second interruption between the ongoing actions, no longer than a 1-second interruption between the ongoing actions, and so forth. For example, continuous ongoing actions may be performed in an iterative manner such that there is no appreciable (e.g., human-perceivable) interruption of the iterative actions.

As used herein, the terms "automatic" and "automatically" may refer to actions that are performed by a computing device or computing system (e.g., of one or more computing devices) without human intervention. For example, automatically performed functions may be performed by computing devices or systems based solely on data stored on and/or received by the computing devices or systems despite the fact that no human users have prompted the computing devices or systems to perform such functions. As but one non-limiting example, the computing devices or systems may make decisions and/or initiate other functions based solely on the decisions made by the computing devices or systems, regardless of any other inputs relating to the decisions.

As used herein, the term "electrical connector" may refer to any suitable electromechanical devices configured to connect two or more electrical conductors to complete one or more electrical circuits between the two or more electrical conductors. For example, the electrical connectors described herein may include any suitable electromechanical devices configured to complete electrical circuits between computing devices or other electronic devices either directly or indirectly coupled to each other via their respective electrical connectors to enable the transfer of data and/or power between the computing devices or other electronic devices.

As used herein, the terms "real time" and "substantially real time" may refer to actions that are performed substantially simultaneously with other actions, without any human-perceptible delay between the actions. For example, two functions performed in substantially real time occur within seconds (or even within milliseconds) of each other. As but one non-limiting example, two functions performed in substantially real time occur within 1 second, within 0.1 second, within 0.01 second, and so forth, of each other.

As used herein, the term "application" may refer to one or more computing modules, programs, processes, workloads, threads, and/or computing instructions executed by a computing system. Example embodiments of an application include software modules, software objects, software instances, and/or other types of executable code.

Various embodiments of the present disclosure generally relate to systems and methods for continuously monitoring an electronic device to determine if tampering is possibly occurring with respect to the electronic device. For example, in certain embodiments, a hardware monitoring device may be configured to be communicatively coupled to the electronic device, and to transmit a command signal indicative of a network connectivity alarm to the electronic device in response to detecting that the hardware monitoring device has lost connection with a communication network. In addition, in certain embodiments, the hardware monitoring device may also be configured to indirectly couple the electronic device to a power source, and to transmit a command signal indicative of a tampering alarm in response to detecting that the hardware monitoring device has lost connection with the power source. As such, the hardware monitoring system described herein enables continuous monitoring of electronic devices, such as IoT devices, to detect potential connectivity and tampering issues relating to the electronic devices. As such, the security of the monitored electronic devices may be automatically enhanced by the hardware monitoring system described herein continuously over time without requiring human intervention.

FIG. 1 is a schematic diagram of a hardware monitoring system 10 that includes a hardware monitoring device 12 configured to continuously monitor the activity of an electronic device 14 (e.g., that is a device completely separate from the hardware monitoring device 12) for the purpose of, for example, protecting the electronic device 14 from tampering via connection to a communication network 16, such as the Internet or other communication network. As illustrated in FIG. 1, in certain embodiments, the hardware monitoring device 12 may include circuitry such as at least one processor 18 configured to execute instructions 20 stored in at least one memory medium 22 of the hardware monitoring device 12, wherein the instructions 20, when executed by the at least one processor 18, enable the hardware monitoring device 12 to perform the hardware monitoring functions described in greater detail herein. In certain embodiments, the instructions 20 may take the form of an application installed on the at least one storage medium 22 and executable by the at least one processor 18 to perform the functionality of the hardware monitoring device 12 described herein. In addition, as also illustrated in FIG. 1, in certain embodiments, the hardware monitoring device 12 includes communication circuitry 24 configured to facilitate communications between the hardware monitoring device 12 and the electronic device 14 either through a direct physical connection 26 or via the communication network 16 to, for example, enable the hardware monitoring device 12 to continuously monitor activity of the electronic device 14, as described in greater detail herein. In addition, in certain embodiments, the hardware monitoring device 12 may include a backup power source 25 (e.g., a battery) that enables the hardware monitoring device 12 to function even when power is not provided (e.g., by a power source 36) to the hardware monitoring device 12.

As also illustrated in FIG. 1, in certain embodiments, the electronic device 14 may also include circuitry such as at least one processor 28 configured to execute instructions 30 stored in at least one memory medium 32 of the electronic device 14, wherein the instructions 30, when executed by the at least one processor 28, enable the electronic device 14 to be continuously monitored by the various hardware monitoring functions described in greater detail herein. In certain embodiments, the instructions 30 may take the form of an application installed on the at least one storage medium 32 and executable by the at least one processor 28 to perform the functionality of the electronic device 14 described herein. In addition, as also illustrated in FIG. 1, in certain embodiments, the electronic device 14 includes communication circuitry 34 configured to facilitate communications between the hardware monitoring device 12 and the electronic device 14 either through the direct physical connection 26 or via the communication network 16 to, for example, enable the hardware monitoring device 12 to continuously monitor activity of the electronic device 14, as described in greater detail herein. In addition, in certain embodiments, the electronic device 14 may include a backup power source 35 (e.g., a battery) that enables the electronic device 14 to function even when power is not provided (e.g., by a power source 36 via the hardware monitoring device 12) to the electronic device 14. In certain embodiments, one or both of the backup power sources 25, 35 may be shareable by the hardware monitoring device 12 and the electronic device 14.

In certain embodiments, the electronic device 14 may include, but is not limited to, a smart home device or other IoT device including the following:

smart appliances, such as washers, dryers, refrigerators, ovens, dishwashers, and so forth;

home entertainment systems, such as televisions, audio systems, game consoles, media players, and so forth;

in-home control systems, such as garage door openers, alarm systems, security systems (e.g., security lights, security cameras, locks, and so forth), safety systems (e.g., smoke detectors, carbon monoxide detectors, and so forth), and other smart home systems (e.g., windows, chimney flues, and so forth);

lighting devices, such as lamps, fixtures, and so forth;

utility systems that provide and/or control electric power, natural gas, water, sewage, heating, ventilation, and air conditioning (HVAC), network access, and so forth, such as HVAC units, thermostats, vents, water meters, water heaters, gas meters, electrical switch boxes, circuit breaker boxes, and so forth; and/or portable or less portable computing devices, such as smartphones, tablet computers, electronic book readers, laptop computers, desktop computers, television set-top boxes, in-vehicle automotive computers or telematics devices, and so forth.

As illustrated in FIG. 1, in certain embodiments, the hardware monitoring device 12 may couple the electronic device 14 to a power source 36. In particular, in certain embodiments, the hardware monitoring device 12 may include a first electrical connector 38 configured to couple to an electrical connector 40 of the electronic device 14 via a first physical connection 26 to facilitate communication (e.g., of data and/or power) between the hardware monitoring device 12 and the electronic device 14, and a second electrical connector 42 configured to couple to an electrical connector 44 of the power source 36 via a second physical connection 46 to facilitate the provision of power from the power source 36 to the electronic device 14 via the hardware monitoring device 12. In certain embodiments, the physical connections 26, 46 may be either direct physical connections 26, 46, where the electrical connectors (e.g., mating male and female electrical connectors) directly couple with each other. However, in other embodiments, the physical connections 26, 46 may be connection cables configured to indirectly couple electrical connectors (e.g., where opposite ends of the connection cables mate with the electrical connectors). In addition, in other embodiments, different combinations of direct and indirect physical connections 26, 46 may be used. In general, the physical connections 26, 46 coupling the hardware monitoring device 12 between the electronic device 14 and the power source 36 enables the hardware monitoring device 12 to detect tampering with the electronic device 14, as described in greater detail herein.

Figure 2:
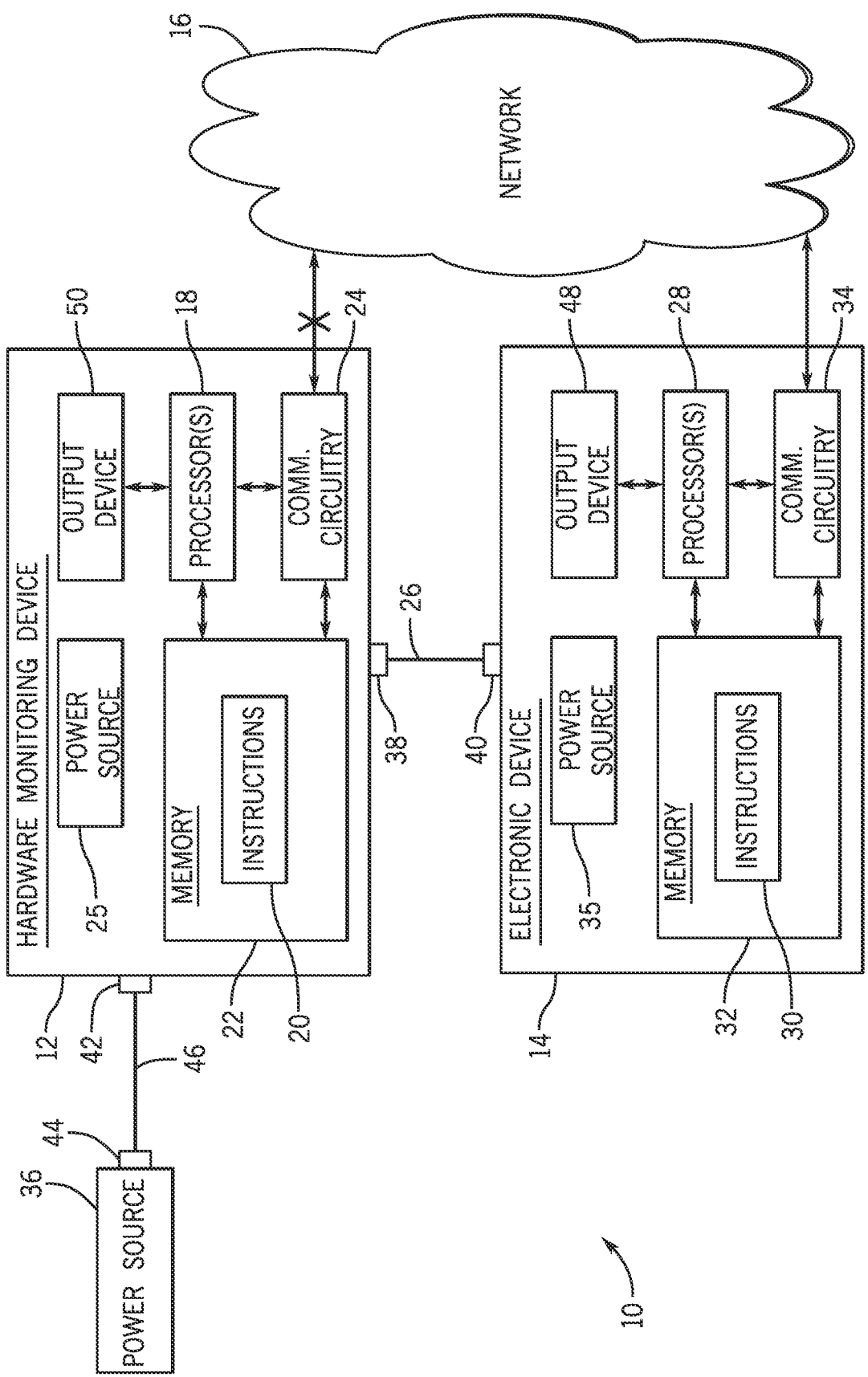
FIG. 2 is a schematic diagram of the hardware monitoring system of FIG. 1 where the hardware monitoring device has lost connection with a communication network, in accordance with embodiments described herein.

In certain embodiments, the hardware monitoring device 12 stays connected to the communication network 16 even when the electronic device 14 is not turned on and/or is not communicatively connected to the communication network 16. In certain embodiments, if the hardware monitoring device 12 loses connection to the communication network 16, the hardware monitoring device 12 may automatically generate a network connectivity alarm to alert a user of the electronic device 14 that connection to the communication network 16 has been lost. For example, as illustrated in FIG. 2, in certain embodiments, if the at least one processor 18 of the hardware monitoring device 12 detects that the communication circuitry 24 of the hardware monitoring device 12 has lost connection to the communication network 16, the at least one processor 18 may automatically generate and transmit a command signal to the at least one processor 28 of the electronic device 14 via the communication circuitry 24, 34 of the hardware monitoring device 12 and the electronic device 14 in response to the detection, and the at least one processor 28 of the electronic device 14 may generate a network connectivity alarm via an output device 48 of the electronic device 14 based at least in part on the received command signal.

In addition, in certain embodiments, the at least one processor 28 of the electronic device 14 may automatically switch the electronic device 14 from a standby mode (e.g., where the electronic device 14 is at least partly powered off) to a powered mode (e.g., where the electronic device 14 is powered on) in response to receipt of the command signal (e.g., indicative of a power-on command) from the hardware monitoring device 12. In certain embodiments, the output device 48 may be a visual output device (e.g., a display)

configured to display the network connectivity alarm. In other embodiments, the output device 48 may be an audible output device (e.g., a speaker) configured to generate an audible network connectivity alarm. Alternatively, or in addition to, in certain embodiments, if the hardware monitoring device 12 loses connection to the communication network 16, the hardware monitoring device 12 may generate a network connectivity alarm via an output device 50 of the hardware monitoring device 12. In certain embodiments, the output device 50 may be a visual output device (e.g., a display) configured to display the network connectivity alarm. In other embodiments, the output device 50 may be an audible output device (e.g., a speaker) configured to generate an audible network connectivity alarm. As such, in certain embodiments, the hardware monitoring device 12 may function as a network connectivity alerting device for the electronic device 14.

Figure 3:
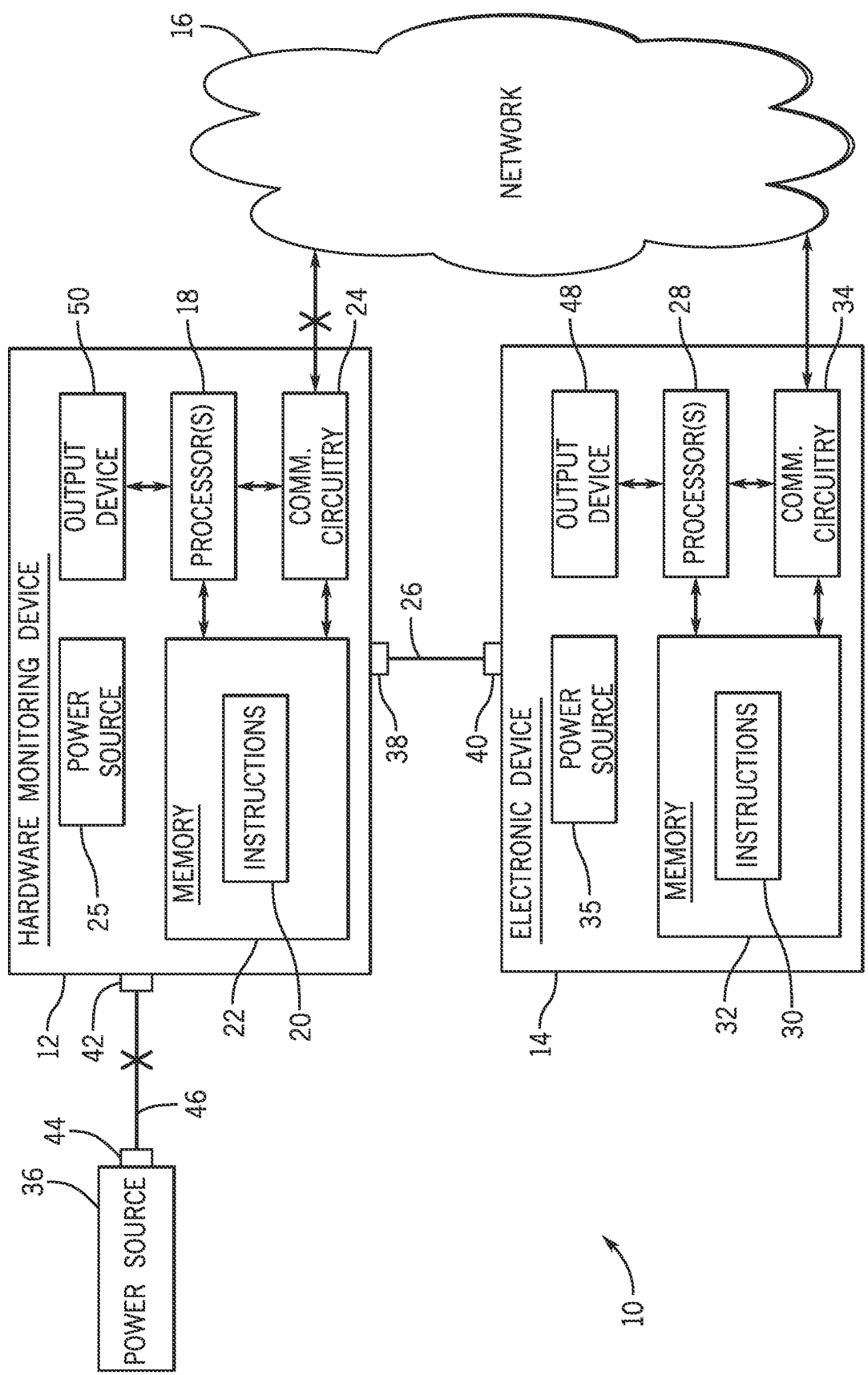
FIG. 3 is a schematic diagram of the hardware monitoring system of FIG. 1 where the hardware monitoring device has lost connection with a communication network and a power source, in accordance with embodiments described herein.

Furthermore, in certain embodiments, if the hardware monitoring device 12 loses connection to both the communication network 16 and the power source 36, the hardware monitoring device 12 may generate a tampering alarm to alert a user of the electronic device 14 that the electronic device 14 may have been tampered with. For example, as illustrated in FIG. 3, in certain embodiments, if the at least one processor 18 of the hardware monitoring device 12 detects that the communication circuitry 24 of the hardware monitoring device 12 has lost connection to the communication network 16 and that the hardware monitoring device 12 is not receiving power from the power source 36, the at least one processor 18 may automatically generate and transmit a command signal to the at least one processor 28 of the electronic device 14 via the communication circuitry 24, 34 of the hardware monitoring device 12 and the electronic device 14 in response to the detections, and the at least one processor 28 of the electronic device 14 may generate a tampering alarm via the output device 48 of the electronic device 14 based at least in part on the received command signal.

In addition, in certain embodiments, the at least one processor 28 of the electronic device 14 may switch the electronic device 14 from a standby mode (e.g., where the electronic device 14 is at least partly powered off) to a powered mode (e.g., where the electronic device 14 is powered on) in response to receipt of the command signal (e.g., indicative of a power-on command) from the hardware monitoring device 12. In certain embodiments, the output device 48 may be a visual output device (e.g., a display) configured to display the tampering alarm. In other embodiments, the output device 48 may be an audible output device (e.g., a speaker) configured to generate an audible tampering alarm. Alternatively, or in addition to, in certain embodiments, if the hardware monitoring device 12 connection to both the communication network 16 and the power source 36, the hardware monitoring device 12 may generate a tampering alarm via an output device 50 of the hardware monitoring device 12. In certain embodiments, the output device 50 may be a visual output device (e.g., a display) configured to display the tampering alarm. In other embodiments, the output device 50 may be an audible output device (e.g., a speaker) configured to generate an audible tampering alarm. As such, in certain embodiments, the hardware monitoring device 12 may also function as a tampering alerting device for the electronic device 14.

Figure 4:
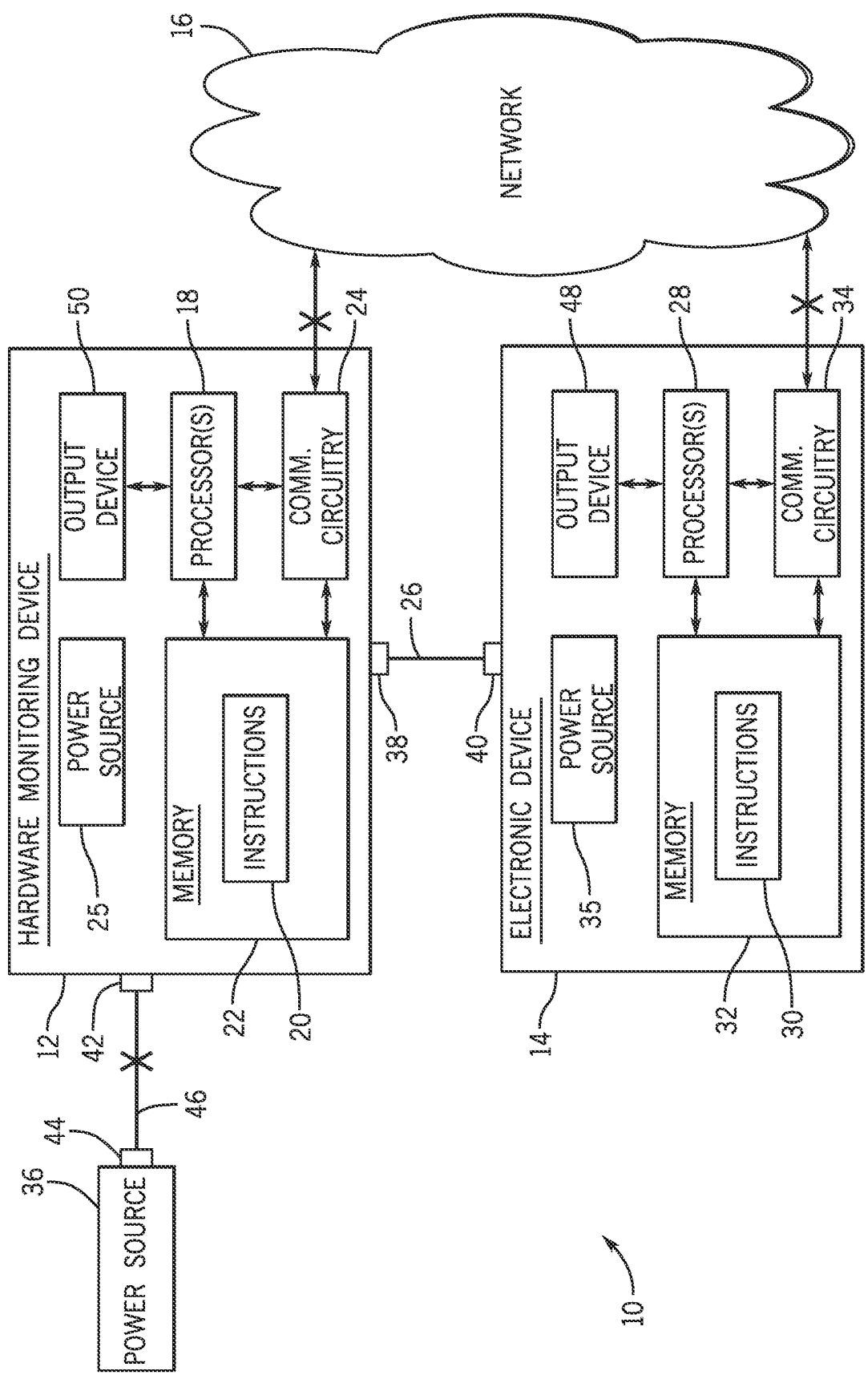
FIG. 4 is a schematic diagram of the hardware monitoring system of FIG. 1 where the hardware monitoring device has lost connection with a communication network and a power source and the electronic device has also lost connection with the communication network, in accordance with embodiments described herein.

In addition to the network connectivity alarms and tampering alarms described with reference to FIGS. 2 and 3, in certain embodiments, some combinations of activity may prompt limited activity. For example, if the hardware monitoring device 12 detects tampering with the electronic device 14, as described with reference to FIG. 3, but the electronic device 14 has also lost connection to the communication network 16, this may suggest that there is no tampering with the electronic device 14, and a generated alarm may reflect this. For example, as illustrated in FIG. 4, in certain embodiments, if the at least one processor 18 of the hardware monitoring device 12 detects that the communication circuitry 24 of the hardware monitoring device 12 has lost connection to the communication network 16 and that the hardware monitoring device 12 is not receiving power from the power source 36, the at least one processor 18 may automatically generate and transmit a command signal to the at least one processor 28 of the electronic device 14 via the communication circuitry 24, 34 of the hardware monitoring device 12 and the electronic device 14 in response to the detections.

In addition, in certain embodiments, the at least one processor 28 of the electronic device 14 may switch the electronic device 14 from a standby mode (e.g., where the electronic device 14 is at least partly powered off) to a powered mode (e.g., where the electronic device 14 is powered on) in response to receipt of the command signal (e.g., indicative of a power-on command) from the hardware monitoring device 12. However, in this embodiment, if the at least one processor 28 of the electronic device 14 also detects that the communication circuitry 34 of the electronic device 14 has also lost connection to the communication network 16, the at least one processor 28 of the electronic device 14 may generate a modified network connectivity alarm (e.g., a network connectivity alarm, as described above, but that also indicates possible tampering) via the output device 48 of the electronic device 14. In certain embodiments, the output device 48 may be a visual output device (e.g., a display) configured to display the modified network connectivity alarm. In other embodiments, the output device 48 may be an audible output device (e.g., a speaker) configured to generate an audible modified network connectivity alarm.

Figure 5:
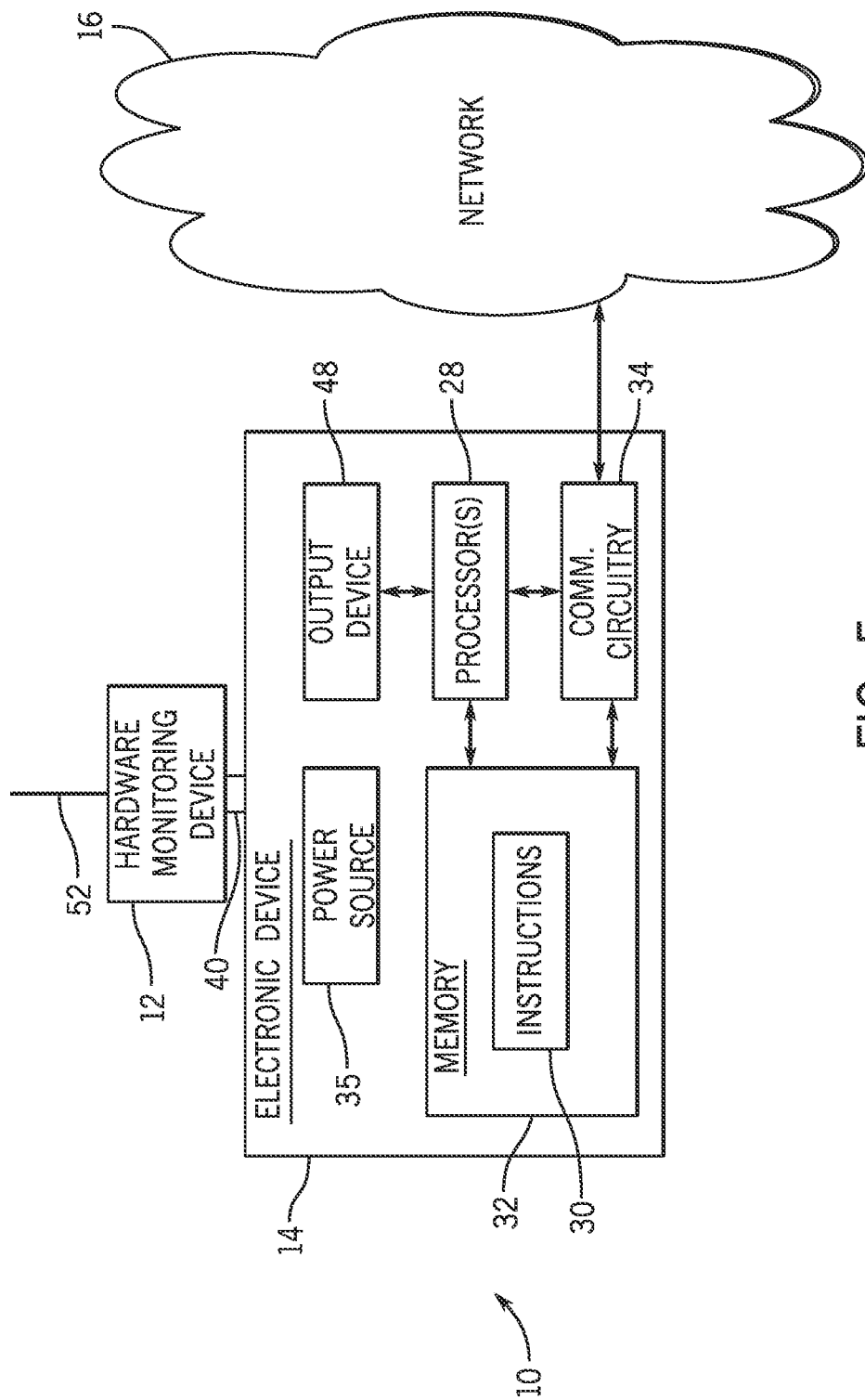
FIG. 5 is a schematic diagram of a hardware monitoring system that includes a hardware monitoring device as a blank coupling an electronic device to a connection cable (e.g., a dongle), in accordance with embodiments described herein.
Figure 6:
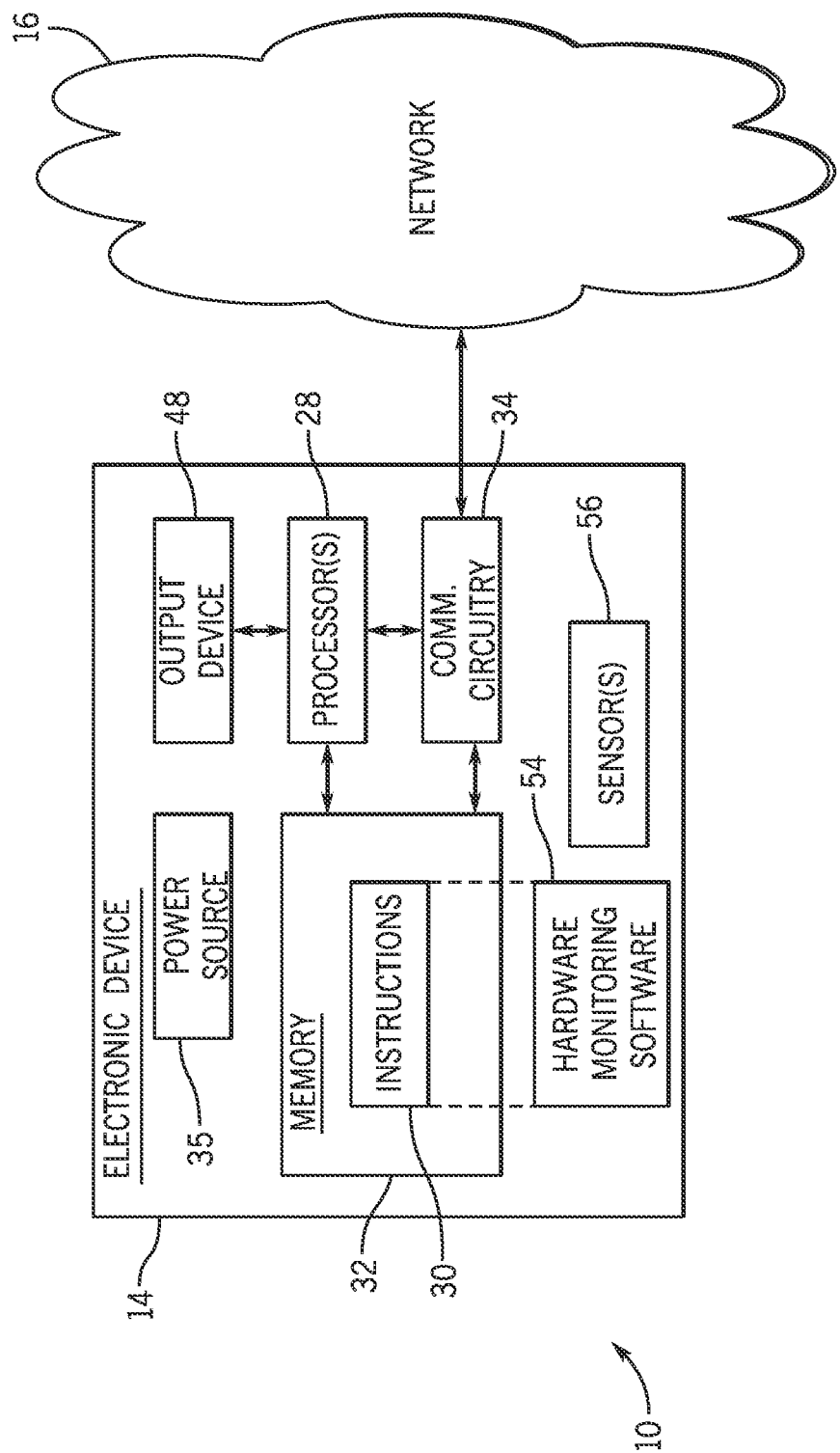
FIG. 6 is a schematic diagram of a hardware monitoring system that includes hardware monitoring software executed by the electronic device, in accordance with embodiments described herein.

Although illustrated in FIGS. 1-4 as including a hardware monitoring device 12 having relatively complex circuitry (e.g., including the at least one processor 18, the at least one memory medium 22, the communication circuitry 24, the output device 50, and so forth), in other embodiments, the hardware monitoring device 12 may instead take the form of a "blank" between connective portions of the electronic device 14. For example, as illustrated in FIG. 5, in certain embodiments, the hardware monitoring device 12 may provide connectivity between an electrical connector 40 of the electronic device 14 and a connection cable 52 (e.g., a dongle) configured to communicatively couple the electronic device 14 to another device. In such an embodiment, if the hardware monitoring device 12 is removed from the electrical connector 40 of the electronic device 14, the electronic device 14 may generate a tampering alarm, which would prevent hardware hacking. For example, if the at least one processor 28 of the electronic device 14 detects that the hardware monitoring device 12 has been removed from (e.g., decoupled from) the electrical connector 40, the at least one processor 28 may generate a tampering alarm via the output device 48 of the electronic device 14 in response to the detection.

In addition, in certain embodiments, the at least one processor 28 of the electronic device 14 may switch the electronic device 14 from a standby mode (e.g., where the electronic device 14 is at least partly powered off) to a powered mode (e.g., where the electronic device 14 is powered on) in response to the detection. In certain embodiments, the output device 48 may be a visual output device (e.g., a display) configured to display the tampering alarm. In other embodiments, the output device 48 may be an audible output device (e.g., a speaker) configured to generate an audible tampering alarm. It will be appreciated that, in such an embodiment, the hardware monitoring device 12 need not include relatively complex circuitry (e.g., such as the at least one processor 18, the at least one memory medium 22, the communication circuitry 24, the output device 50, and so forth, of the hardware monitoring device 12 illustrated in FIGS. 1-4), or even any circuitry at all. Rather, in such an embodiment, the hardware monitoring device 12 only needs to be detectable by the electronic device 14 (e.g., when it is decoupled from the electrical connector 40).

Although primarily described herein as being a physical device, which may be coupled/attached to the electronic device 14, in other embodiments, the hardware monitoring device 12 may instead be embodied as hardware monitoring software 54 executed by the at least one processor 28 (e.g., as part of the instructions 30 stored in the at least one memory medium 32) of the electronic device 14. For example, in certain embodiments, the hardware monitoring software 54 may run at bootup of the electronic device 14 from an E(E)PROM or BIOS, performing hardware-level monitoring of the same aspects of tampering described in greater detail herein with respect to the hardware monitoring device 12. In certain embodiments, the electronic device 14 may include one or more hardware monitoring sensors 56, such as a photoelectric sensor configured to detect physical tampering with the electronic device 14, a piezoelectric sensor configured to detect electrical tampering with the electronic device 14, and/or a magnetic sensor configured to detect attempts to disrupt or damage magnetic storage on the electronic device 14. Any or all of these types of hardware monitoring sensors 56 may be used by the hardware monitoring software 54 to perform the same functionality of the hardware monitoring device 12, as described in greater detail herein.

Figure 7:
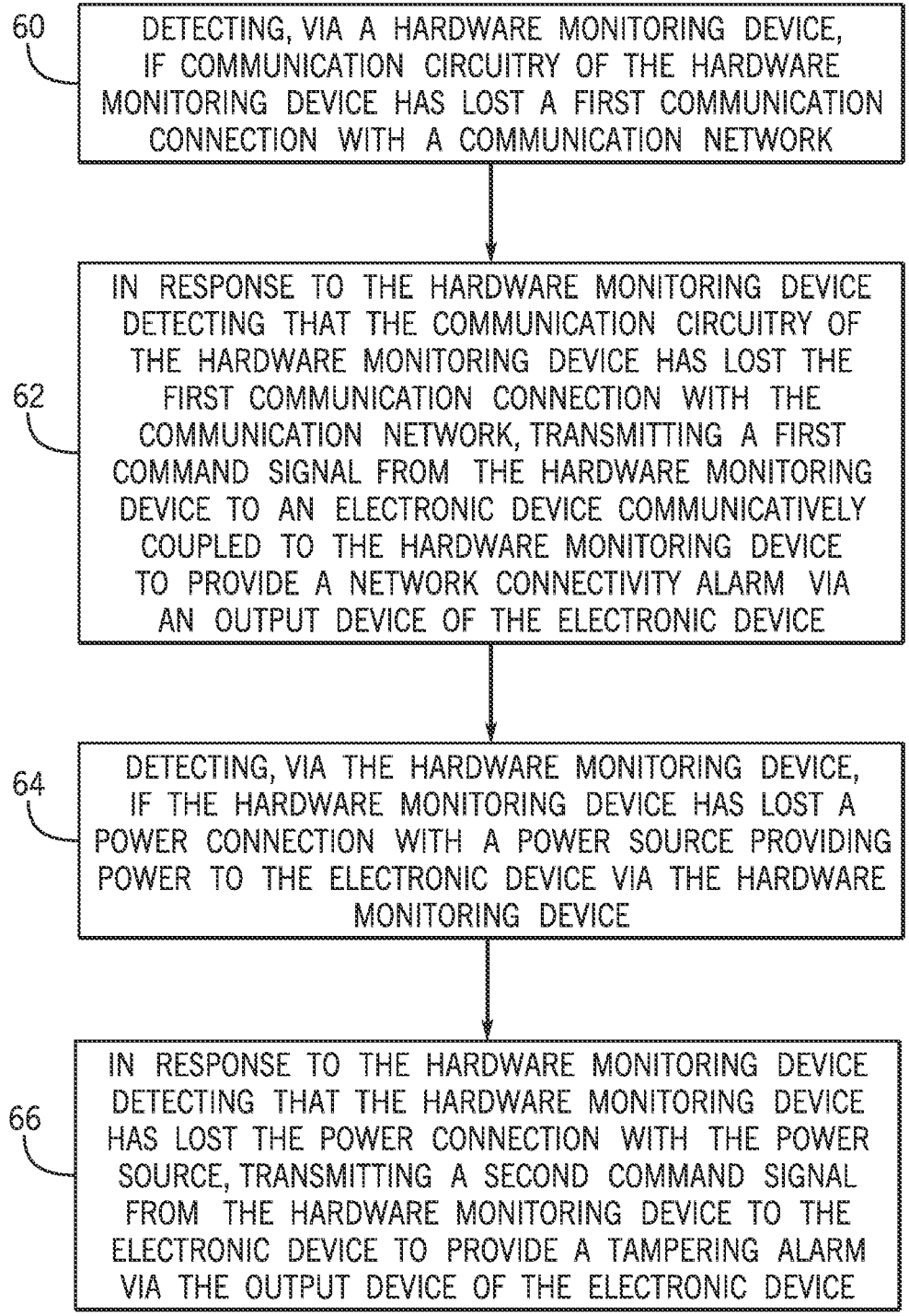
FIG. 7 is a flow diagram of a method of using a hardware monitoring system, in accordance with embodiments described herein.

FIG. 7 is a flow diagram of a method 58 of using the hardware monitoring system 10 described herein. As illustrated, in certain embodiments, the method 58 includes detecting, via a hardware monitoring device 12, if communication circuitry 24 of the hardware monitoring device 12 has lost a first communication connection with a communication network 16 (block 60). In addition, in certain embodiments, the method 58 includes, in response to the hardware monitoring device 12 detecting that the communication circuitry 24 of the hardware monitoring device 12 has lost the first communication connection with the communication network 16, transmitting a first command signal from the hardware monitoring device 12 to an electronic device 14 communicatively coupled to the hardware monitoring device 12 to provide a network connectivity alarm via an output device 48 of the electronic device 14 (block 62).

In addition, in certain embodiments, the method 58 includes detecting, via the hardware monitoring device 12, if the hardware monitoring device 12 has lost a power connection with a power source 36 providing power to the electronic device 14 via the hardware monitoring device 12 (block 64). In addition, in certain embodiments, the method 58 includes, in response to the hardware monitoring device 12 detecting that the hardware monitoring device 12 has lost the power connection with the power source 36, transmitting a second command signal from the hardware monitoring device 12 to the electronic device 14 to provide a tampering alarm via the output device 48 of the electronic device 14 (block 66).

In addition, in certain embodiments, the method 58 includes switching the electronic device 14 from a standby mode to a power mode in response to the electronic device 14 receiving the first command signal from the hardware monitoring device 12. In addition, in certain embodiments, the method 58 includes displaying the network connectivity alarm and the tampering alarm via a visual output device 48 of the electronic device 14. In addition, in certain embodiments, the method 58 includes generating an audible network connectivity alarm and an audible tampering alarm via an audible output device 48 of the electronic device 14.

In addition, in certain embodiments, the method 58 includes detecting, via the electronic device 14, if communication circuitry 34 of the electronic device 14 has lost a second communication connection with the communication network 16 in response to the electronic device 14 receiving the first command signal from the hardware monitoring device 12, and providing a modified network connectivity alarm via the output device 48 of the electronic device 14 in response to the electronic device 14 detecting that the communication circuitry 34 of the electronic device 14 has lost the second communication connection with the communication network 16.

In certain embodiments, a first electrical connector 38 of the hardware monitoring device 12 is directly physically coupled to a second electrical connector 40 of the electronic device 14. In other embodiments, a first electrical connector 38 of the hardware monitoring device 12 is indirectly coupled to a second electrical connector 40 of the electronic device 14 via a connection cable 52.

In addition, as described in greater detail herein, in certain embodiments, a hardware monitoring device 12 includes a first electrical connector 38 configured to communicatively couple the hardware monitoring device 12 to an electronic device 14. In addition, in certain embodiments, the hardware monitoring device 12 includes communication circuitry 24 configured to enable a communication connection of the hardware monitoring device 12 with a communication network 16. In addition, in certain embodiments, the hardware monitoring device 12 includes at least one processor 18 configured to execute instructions 20 stored in at least one memory medium 22 of the hardware monitoring device 12. The instructions 20, when executed by the at least one processor 18, cause the at least one processor 18 to detect if the communication circuitry 24 has lost the communication connection with the communication network 16, and to transmit a first command signal (e.g., indicative of a network connectivity alarm) to the electronic device 14 in response to detecting that the communication circuitry 24 has lost the communication connection with the communication network 16.

In addition, in certain embodiments, the hardware monitoring device 12 includes a second electrical connector 42 configured to couple the hardware monitoring device 12 to a power source 36 to establish a power connection of the hardware monitoring device 12 with the power source 36. In certain embodiments, the hardware monitoring device 12 is configured to provide power from the power source 36 to the electronic device 14, wherein the instructions 20, when executed by the at least one processor 18, cause the at least one processor 18 to detect if the second electrical connector 42 has lost the power connection with the power source 36, and to transmit a second command signal (e.g., indicative of a tampering alarm) to the electronic device 14 in response to detecting that the second electrical connector 42 has lost the power connection with the power source 36.

In addition, in certain embodiments, the instructions 20, when executed by the at least one processor 18, cause the at least one processor 18 to cause the network connectivity alarm and the tampering alarm to be displayed on a visual output device 50 of the hardware monitoring device 12. In addition, in certain embodiments, the instructions 20, when executed by the at least one processor 18, cause the at least one processor 18 to generate an audible network connectivity alarm and an audible tampering alarm via an audible output device 50 of the hardware monitoring device 12. In addition, in certain embodiments, the instructions 20, when executed by the at least one processor 18, cause the at least one processor 18 to transmit a third command signal is indicative of a power-on command for the electronic device 14.

In addition, in certain embodiments, the first electrical connector 38 of the hardware monitoring device 12 is configured to directly physically couple to a second electrical connector 40 of the electronic device 14. However, in other embodiments, the first electrical connector 38 of the hardware monitoring device 12 is configured to indirectly couple to a second electrical connector 40 of the electronic device 14 via a connection cable 52.

In addition, as described in greater detail herein, in certain embodiments, a monitoring system includes an electronic device 14 configured to execute hardware monitoring software 54 to facilitate detection of tampering with the electronic device 14 based at least in part on a state of at least one hardware monitoring sensor 56 of the electronic device 14. In certain embodiments, the at least one hardware monitoring sensor 56 includes a photoelectric sensor configured to detect physical tampering with the electronic device 14. In other embodiments, the at least one hardware monitoring sensor 56 includes a piezoelectric sensor configured to detect electrical tampering with the electronic device 14. In other embodiments, the at least one hardware monitoring sensor 56 includes a magnetic sensor configured to detect attempts to disrupt or damage magnetic storage on the electronic device 14.

In addition, as described in greater detail herein, in certain embodiments, a hardware monitoring system 10 includes a hardware monitoring device 12 configured to facilitate detection of tampering with an electronic device 14 communicatively coupled to the hardware monitoring device 12 based at least in part on a state of the hardware monitoring device 12. In certain embodiments, the hardware monitoring device 12 is configured to generate a network connectivity alarm relating to the electronic device 14 based at least in part on detection that the hardware monitoring device 12 has lost a first communication connection with a communication network 16. In addition, in certain embodiments, the hardware monitoring device 12 is configured to generate a tampering alarm relating to the electronic device 14 based at least in part on detection that the hardware monitoring device 12 has lost a power connection with a power source 36 providing power to the electronic device 14 via the hardware monitoring device 12. In such embodiments, the electronic device 14 is configured to generate a modified network connectivity alarm relating to the electronic device 14 based at least in part on detection, via the electronic device 14, that the electronic device 14 has lost a second communication connection with the communication network 16. In addition, in certain embodiments, the electronic device 14 is configured to generate a tampering alarm based at least in part on detection, via the electronic device 14, that the hardware monitoring device 12 has become communicatively decoupled from the electronic device 14.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

The invention claimed is:

1. A hardware monitoring device, comprising:
    a first electrical connector configured to directly physically couple the hardware monitoring device to an electronic device;
    a second electrical connector configured to directly physically couple the hardware monitoring device to a power source to establish a power connection of the hardware monitoring device with the power source, wherein the hardware monitoring device is configured to provide power from the power source to the electronic device;
    communication circuitry configured to enable a communication connection of the hardware monitoring device with a communication network; and
    at least one processor configured to execute instructions stored in at least one memory medium of the hardware monitoring device, wherein the instructions, when executed by the at least one processor, cause the at least one processor to:
        detect if the communication circuitry has lost the communication connection with the communication network;
        transmit a first command signal to the electronic device in response to detecting that the communication circuitry has lost the communication connection with the communication network, wherein the first command signal is indicative of a network connectivity alarm;
        detect if the second electrical connector has lost the power connection with the power source; and
        transmit a second command signal to the electronic device in response to detecting that the second electrical connector has lost the power connection with the power source and that the communication circuitry has lost the communication connection with the communication network, wherein the second command signal is indicative of a tampering alarm.

2. The hardware monitoring device of claim 1, wherein the instructions, when executed by the at least one processor, cause the at least one processor to cause the network connectivity alarm and the tampering alarm to be displayed on a visual output device of the hardware monitoring device.

3. The hardware monitoring device of claim 1, wherein the instructions, when executed by the at least one processor, cause the at least one processor to generate an audible network connectivity alarm and an audible tampering alarm via an audible output device of the hardware monitoring device.

4. The hardware monitoring device of claim 1, wherein the instructions, when executed by the at least one processor, cause the at least one processor to transmit a third command signal indicative of a power-on command for the electronic device.

5. The hardware monitoring device of claim 1, wherein the first electrical connector of the hardware monitoring device is configured to directly physically couple to a second electrical connector of the electronic device.

6. The hardware monitoring device of claim 1, wherein the first electrical connector of the hardware monitoring device is configured to indirectly couple to a second electrical connector of the electronic device via a connection cable.

7. The hardware monitoring device of claim 1, wherein the electronic device is an Internet of Things (IoT) device.

8. A method, comprising:
   detecting, via a hardware monitoring device, if communication circuitry of the hardware monitoring device has lost a first communication connection with a communication network;
   in response to the hardware monitoring device detecting that the communication circuitry of the hardware monitoring device has lost the first communication connection with the communication network, transmitting a first command signal from the hardware monitoring device to an electronic device directly physically coupled to the hardware monitoring device to provide a network connectivity alarm via an output device of the electronic device;
   detecting, via the hardware monitoring device, if the hardware monitoring device has lost a power connection with a power source directly physically coupled to the hardware monitoring device and providing power to the electronic device via the hardware monitoring device; and
   in response to the hardware monitoring device detecting that the hardware monitoring device has lost the power connection with the power source and that the communication circuitry of the hardware monitoring device has lost the first communication connection with the communication network, transmitting a second command signal from the hardware monitoring device to the electronic device to provide a tampering alarm via the output device of the electronic device.

9. The method of claim 8, comprising displaying the network connectivity alarm and the tampering alarm via a visual output device of the electronic device.

10. The method of claim 8, comprising generating an audible network connectivity alarm and an audible tampering alarm via an audible output device of the electronic device.

11. The method of claim 8,
   detecting, via the electronic device, if communication circuitry of the electronic device has lost a second communication connection with the communication network in response to the electronic device receiving the first command signal from the hardware monitoring device; and
   providing a modified network connectivity alarm via the output device of the electronic device in response to the electronic device detecting that the communication circuitry of the electronic device has lost the second communication connection with the communication network.

12. The method of claim 8, comprising switching the electronic device from a standby mode to a power mode in response to the electronic device receiving the first command signal from the hardware monitoring device.

13. The method of claim 8, wherein the electronic device is an Internet of Things (IoT) device.

* * * * *